July 27, 1926.  1,593,587
J. A. MILLER
PLEASURE RAILWAY STRUCTURE
Filed July 22, 1925   3 Sheets-Sheet 1
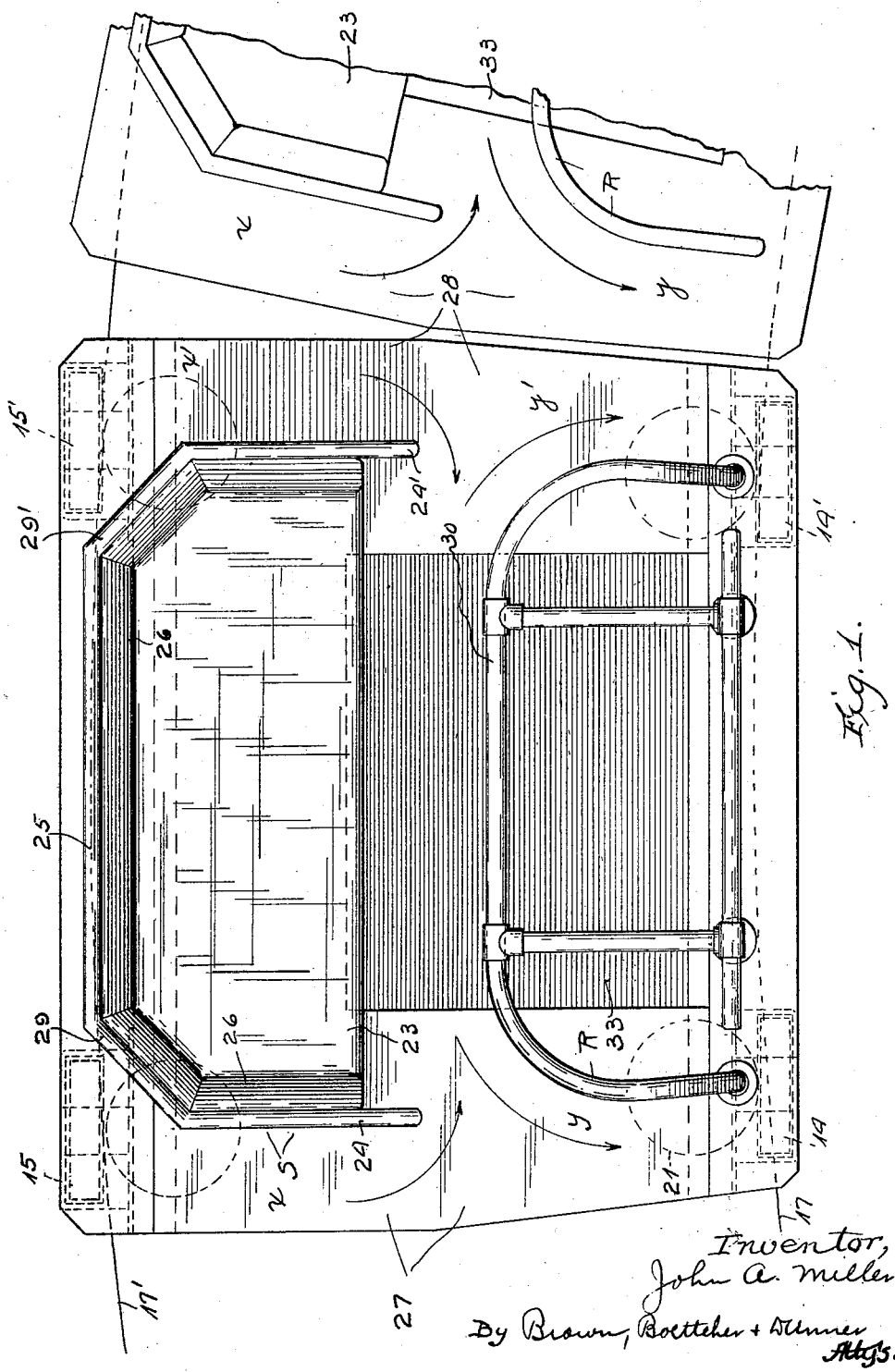

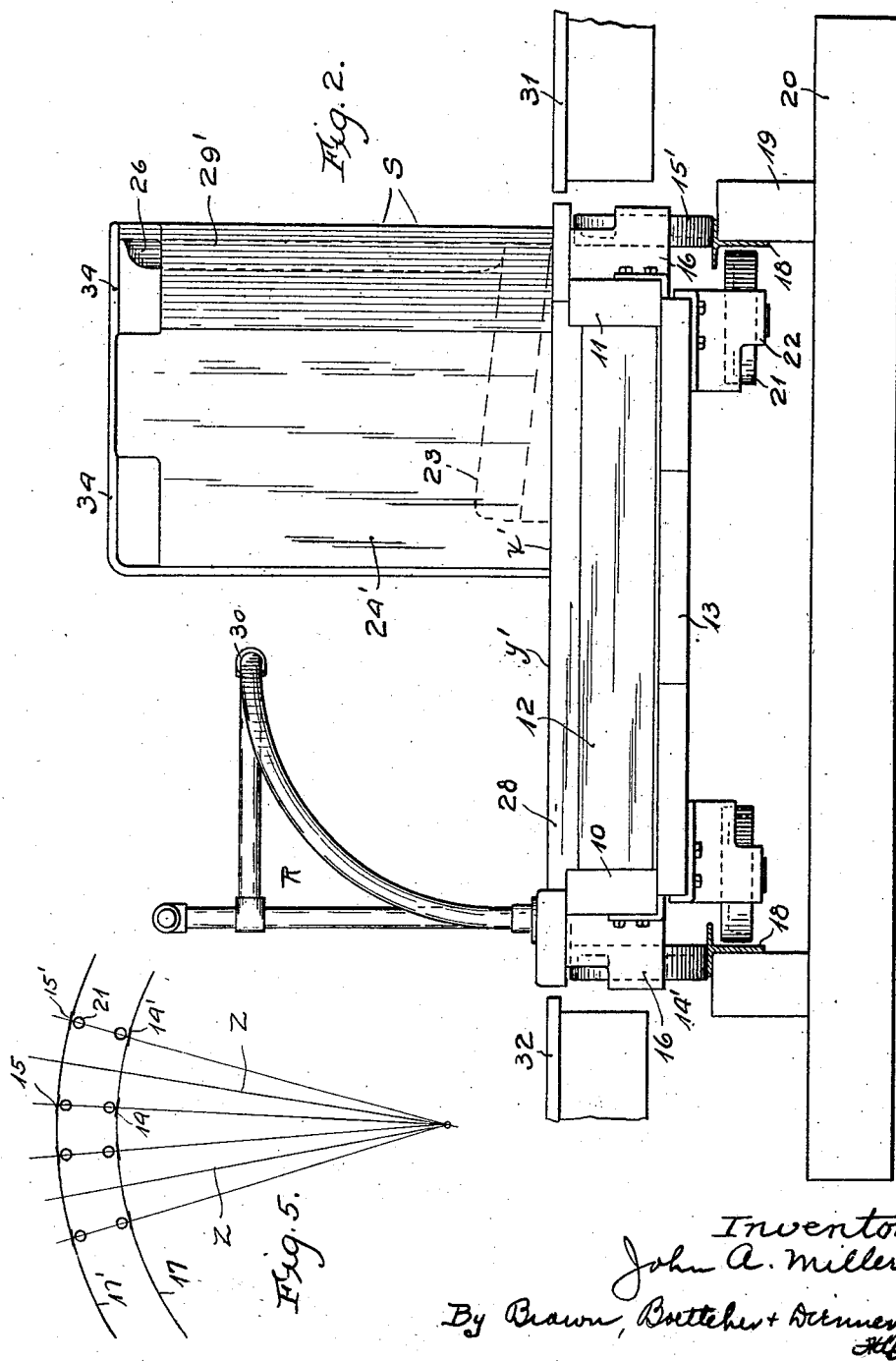

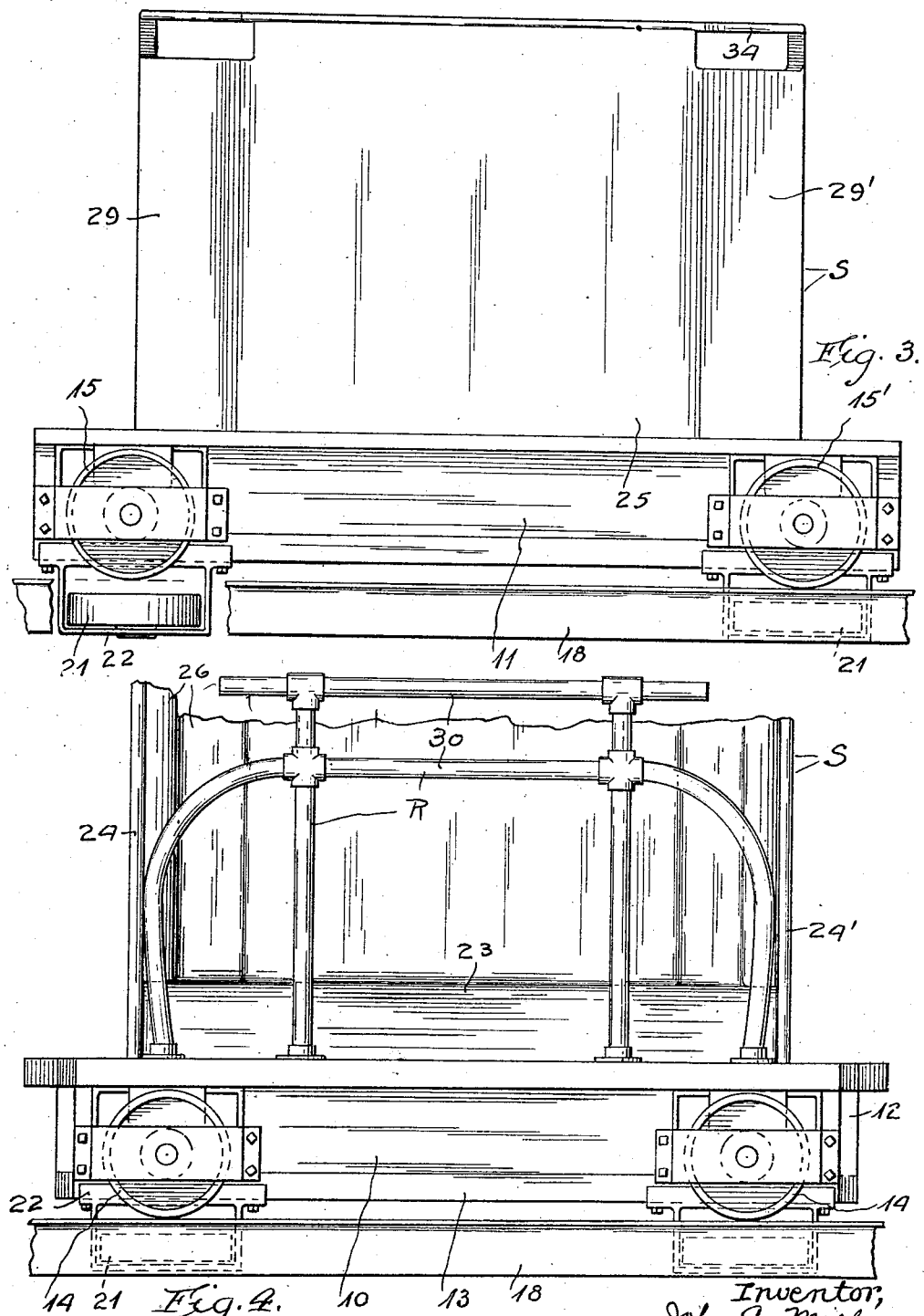

Patented July 27, 1926.

1,593,587

UNITED STATES PATENT OFFICE.

JOHN A. MILLER, OF HOMEWOOD, ILLINOIS.

PLEASURE-RAILWAY STRUCTURE.

Application filed July 22, 1925. Serial No. 45,149.

My invention relates to pleasure railway structures in which trains of cars travel rapidly over tracks having vertical and horizontal curves, the propelling force being that of gravity.

The usual arrangement heretofore has been to provide a loading platform and an unloading platform on the same side of the tracks and usually separated by a fence or railing, the cars stopping at the unloading platform to be unloaded and are then shoved forwardly to the loading platform for reloading. This arrangement wasted considerable time. One of the important objects of my invention is to provide a loading platform and unloading platform on opposite sides of the tracks for the passage of a car or train between them, and to so arrange the seating and passageway in the cars that the passengers, who have completed the ride, may step from the cars onto the unloading platform while at the same time passengers enter from the loading platform to reload the cars, such arrangements requiring only a single stop and eliminating all confusion as the passengers leaving and entering all travel in the same direction.

Another important object of the invention is to arrange the seating in the cars, and the track, so that the passengers will always face toward the inside of the tracks or toward the center of the curves.

Another important object is to so arrange the tractor wheels of the cars that the cars may travel rapidly around curves as well as along straight tracks, and to permit extreme banking at the curves with all the wheels efficiently engaging the rails.

The above and other features of the invention are incorporated in the structures disclosed on the accompanying drawings, in which:—

Figure 1 is a plan view of a complete car and part of the adjacent car of a train;

Figure 2 is an end elevational view;

Figure 3 is a rear elevational view of a car;

Figure 4 is a front elevational view, and

Figure 5 is a diagrammatic view showing the arrangement of the car tractor wheels.

The truck or body of the car shown comprises the front and rear beams 10 and 11, the cross beams 12 and the floor boards 13.

The car shown has four tractor wheels, the two wheels 14 and 15 being at the left end (Figure 1), and the wheels 14' and 15' being at the right end. For each wheel is provided a suitable journal box 16 secured to the car, truck or body. On Figures 1 and 5, 17 and 17' represent, respectively, the inner and outer rails of the tracks at one of the curves of a track structure, the preferred track structures being one in which the radii of curvatures of the several curves are alike or closely so. For the purposes of my invention, a track structure, such as disclosed in my Patent No. 1,536,448, of May 5th, 1925, would be practical.

It will be noted (Figures 1 and 5), that the inside track wheels 14 and 14' are closer together than the outer track wheels 15 and 15', and that the lines passing respectively through the centers of the wheels 14 and 15, and 14' and 15', are coincident with radii of curvatures of the curves around which the car travels. The wheels, however, are not inclined at right angles to these radii of curvatures and consequently not tangential to the rails at the curves, but they are so arranged at right angles with the radial lines passing through the centers of the cars so that the wheels would be tangential to the rails of the straight track sections. The wheels could be set at right angles to the radial lines passing through the centers, as disclosed in my patent, above referred to, but under certain conditions of operation, the setting of the wheels in the radial lines and tangential to the straight tracks is preferable, as the track friction may be more distributed between the curves and the straight sections of tracks. Setting of the inside wheels closer together will permit more efficient banking at the curves and the cars will properly engage the rails along such bank sections with the proper degree of safety.

Any suitable track and rail construction may be used. The arrangement shown is that disclosed in my Patent No. 1,536,122 of May 5, 1925, involving the T rails 18 secured on stringer structures 19 which are mounted on the ties 20. With each tractor wheel of the car is associated a horizontal safety roller 21 journaled in a casting 22 secured to the underside of the car body, the horizontal safety roller engaging with the inner sides and undersides, respectively, of the web and tops of the T rails, all as disclosed in my patent just referred to.

Describing now the passenger accommodation arrangement, I provide the seat structure S, extending along the rear side of the car body parallel with the track. The seat structure comprises the cushions or upholstered seats 23 and the surrounding end walls 24 and 24' and the rear wall 25, these walls being lined by upholstering 26. Extending forward of the seats and in front thereof is the guard and supporting railing R secured at its base along the front side of the car body. The seat is preferably of a width to accommodate two adults.

Along the end of the car body, outside of the seat and guard rail structures, are the running boards or floor sections 27 and 28 forming the entrance pasageways X and X' from the rear side of the car to the seat 23, and the exit passageways Y and Y' from the seat to the front side of the car. To facilitate the passage of passengers, the seat structure has the diagonal or bevel corners 29 and 29', and the inner rail bar 30 is rounded at its ends. With this arrangement passengers can enter from the rear side of the the car and proceed to the seat while the former passengers leave by way of the exit passageways to the front side of the car. Where there are two passengers, one proceeds along the left passageway and the other along the right end passageway. Confusion is thus avoided and the cars can be rapidly unloaded and reloaded.

In cooperation with the car arrangement described, I place the loading platform 31 for the entrance sides of the cars and the unloading platform 32 for the exit sides of the cars, the platforms being on opposite sides of the track where the track extends through the railway structure depot or station. The platforms are on the same level as the entrance and exit passageways of the cars. Loading and unloading are thus quickly and safely accomplished during a single stop of the train, this effecting considerable saving in time during a day and correspondingly increasing the capacity of the railway.

To make the passengers more comfortable and also to insure greater safety, the foot space 33 is provided in front of the seat. When the car is traveling rapidly around and over the various curves the passengers can then brace themselves against the walls surrounding the foot space and can also support themselves by means of the guard rail structure R. The seat structure S is also cut away in various places to leave grip sections 34, these grip sections assisting the passengers when traveling along the entrance passageway.

As a train travels around the lateral curves, the passengers will be facing toward the curve centers and each passenger will, therefore, be able to see all the other passengers on the train. When the car travels rapidly around the lateral curves, centrifugal force will assist in holding the passengers in the seats, the seat surrounding walls being of sufficient height to prevent throwing out of the passengers.

As illustrated in Figure 1, the cars of a train are kept as close together as possible to prevent passengers from stepping between, and to permit flexibility of the train during travel around the track and to permit bumping of adjacent cars the front sections of the cars are tapered at the ends.

With my improved construction compact trains may run rapidly and smoothly over the curves of the track with full safety for the passengers, and the arrangement in the cars in cooperation with the separate and opposite loading and unloading platforms necessitating only a single stop, cuts down the time lost to a minimum and increases correspondingly the capacity of the structure.

I claim as follows:—

1. In a pleasure railway structure, the combination of a track, a loading platform at one side of said track, an unloading platform at the opposite side of said track, a car for traveling on said track, a seat on said car facing the unloading side of said track, an exit passageway on said car to said unloading platform, and entrance passageway to said seat from said loading platform.

2. In a pleasure railway structure, the combination of a loading platform and an unloading platform situated opposite each other, a track running between said platforms, a car for traveling on said track, a seat on said car extending along the loading side thereof and facing the unloading side, an entrance passageway on said cars to said seats from the loading platform, and an exit passageway on said car from the seat to the unloading platform.

3. In a pleasure railway structure, the combination of a loading platform and an unloading platform placed opposite each other, a track running between said platforms, a car for traveling said track, a seat on said car parallel with and at the loading side of the car, entrance passageway at the end of said seat communicating with said loading platform, and an exit passageway from said seat communicating with said unloading platform.

4. In a pleasure railway structure, the combination of a loading platform and an unloading platform placed opposite each other, a track running between said platforms, a car for traveling over said track between said platforms, a seat on said car extending along the loading side thereof, a guard structure in front of said seat along the unloading side of the car, an entrance passageway around said seat communicating with the loading platform, and an exit passageway around said guard structure communicating with said unloading platform.

5. In a pleasure railway structure, the combination of a loading platform and an unloading platform placed opposite each other, a track running between said platforms, a car for traveling over said track, cross passageways at the ends of said car extending between the platforms when the car is in position between the platforms, and seating structure on said car between said passageways, said passageways permitting simultaneous entrance to and exit from said seating structure by passengers.

6. In a pleasure railway structure, the combination of an unloading platform and a loading platform placed opposite each other, a track running between said platforms, a car for traveling said track, a seat on said car, a guard structure for said seat, an entrance passageway on said car extending around said seat and communicating with the loading platform, and an exit passageway on said car extending around said guard structure and communicating with the unloading platform.

7. In a pleasure railway structure, the combination of straight and curved track sections, a car for traveling over said track sections, a set of tractor wheels at each end of said car, the wheel centers of each set being in the radial line of curvature when the car is traveling around the curved track sections, but said wheels being tangential to the rails when the car is traveling over the straight track sections.

8. In a pleasure railway structure, the combination of a track comprising lateral curves, a car for traveling over said track, wheels on said car for engaging with the inner rails of the curves, wheels on said car for engaging with the outer rails of the curves, the wheels for engaging the outer curves being in a common plane, the wheels for engaging with the inner track being in a common plane and being closer together than the wheels which engage with the outer track.

In witness whereof, I hereunto subscribe my name this 17 day of July, 1925.

JOHN A. MILLER.